3,720,704
PROCESS FOR PREPARING 1,4-DIACETOXY-2-BUTENE FROM DICHLOROBUTENES
Toshio Sakomura, Hisashi Kisaki, Takashi Tada, and Shunsuke Mabuchi, Yamaguchi-ken, Japan, assignors to Toyo Soda Manufacturing Co., Ltd., Yamaguchi-ken, Japan
No Drawing. Filed June 16, 1969, Ser. No. 833,703
Claims priority, application Japan, June 21, 1968, 43/43,125
Int. Cl. C07c 67/02
U.S. Cl. 260—491                     8 Claims

ABSTRACT OF THE DISCLOSURE

In a process for preparing acetic acid esters by reacting 3,4-dichloro-1-butene or a mixture of 3,4-dichloro-1-butene and 1,4-dichloro-2-butene with an alkali metal acetate, a process for preparing 1,4-diacetoxy-2-butene selectively characterized by adding at least one elemental metal selected from a group consisting of copper, iron and zinc or a compound thereof.

BACKGROUND OF THE INVENTION

Field of the invention

This invention relates to a process for preparing 1,4-diacetoxy-2-butene in high yield from 3,4-dichloro-1-butene or a mixture of dichlorobutene isomers obtained from chlorination of butadiene. 1,4-diacetoxy-2-butene is known to be useful for the production of butenediol. Butenediol can be converted into butanediol which is known as a raw material for polyester fiber, tetrahydrofuran, 2,5-dihydrofuran, polyacetal resin etc. 1,4-diacetoxy-2-butene per se is useful as the raw material for plastics.

Description of prior art

A process for preparing 1,4-diacetoxy-2-butene by reacting 1,4-dichloro-2-butene with sodium acetate is publicly known.

Further, it has been believed that 3,4-dichloro-1-butene cannot be used as a starting material for the production of an ester on an industrial basis because of its very low reactivity. Therefore, in industrial use, to avoid such disadvantage, the 3,4-dichloro-1-butene is isomerized into 1,4-dichloro-2-butene and the 1,4-dichloro-2-butene thus obtained is used for the esterification reaction. However, such process is not so attractive because of low yield due to the esterification reaction and entrained separation-purification steps and because the apparatus requires high capital investment. Accordingly, manufacturers have naturally desired a process by which the isomerization and esterification reactions for converting all of the mixed raw material into the desired ester product could be carried out in one step. The search for such a process has been going on for a long time.

DESCRIPTION OF THE INVENTION

Accordingly, one object of this invention is to provide a process for preparing 1,4-diacetoxy-2-butene from a dichlorobutene or a mixture of dichlorobutenes. In accordance with the process of this invention, an impure starting material containing dichlorobutenes can be used conveniently.

The present invention provides in a process for preparing acetic acid esters by reacting 3,4-dichloro-1-butene or a mixture of 3,4-dichloro-1-butene and 1,4-dichloro-2-butene with an alkali metal acetate, a process for preparing 1,4-diacetoxy-2-butene selectively characterized by adding into the reaction system at least one elemental metal selected from the group consisting of copper, iron and zinc or a compound thereof.

Usually, in the vapor phase chlorination reaction of butadiene with elemental chlorine, a mixture containing 3,4-dichloro-1-butene 30–40% by weight, 1,4-dichloro-2-butene 50–60% by weight, and the other lower and higher boiling materials 6–10% by weight in total can be obtained at a chlorine conversion level of 100%.

In accordance with the process of this invention, 3,4-dichloro-1-butene or a mixture obtained by removing lower boiling materials and higher boiling materials from the aforementioned reaction mixture, i.e. a dichlorobutene mixture containing 3,4-dichloro-1-butene, cis-1,4-dichloro-2-butene, trans-1,4-dichloro-2-butene, can be used as the starting material. There is no need to separate each dichlorobutene isomer respectively.

This invention has been completed by searching for the set of conditions which allows said isomerization and esterification simultaneously. It was found that almost all of the dichlorobutenes can be converted into 1,4-diacetoxy-2-butene in high yield by the addition of an elemental metal such as copper, iron or zinc or a compound thereof, e.g. salt thereof, into the reaction system.

Detailed conditions and processes for carrying out the invention are given hereunder.

If a dichlorobutenes mixture is used as the starting material, there is no limitation on the concentration of 3,4-dichlorobutene-1. In general, it is convenient to use a mixture having a composition which corresponds to that of the product obtained from the vapor phase chlorination reaction of butadiene.

The reaction can be carried out either in homogeneous phase or in heterogeneous phase. Coexistence of sodium chloride produced by the reaction has no influence on the reaction.

From the view point of reaction velocity, it is preferred that the reaction temperature be as high as possible. However, a temperature higher than 150° C. is not suitable because it promotes side reactions. At a reaction temperature of 150° C. or more a large amount of high boiling material is produced. On the other hand, a temperature less than 70° C. is not preferable because the reaction velocity is too low. Accordingly, the preferred reaction temperature is within the range of from 70° C. to 150° C. It is desirable that the catalyst be soluble in the liquid to be used as a reaction medium. However, it is not necessary that the catalyst have high solubility. Compounds suitable as catalyst include a salt of a lower aliphatic acid such as formate, acetate, etc. and a salt of an aromatic carboxylic acid such as benzoate, or naphthenate, etc., the cation portion thereof is selected from copper, iron, zinc, etc. A salt which is, in general, referred to as insoluble can also be used as a catalyst, if said salt can dissolve in the reaction system. For example, cuprous chloride which dissolves as a complex in sodium chloride containing water can be a preferred catalyst if the esterification reaction is carried out in the presence of water as the reaction medium. Of course, cupric chloride, cupric sulfate, etc. can also be used as the effective catalyst.

Incidentally, it is natural that the catalyst should be effective when dissolved. Besides, the insoluble portion is also effective. In fact, the isomerization reaction is accelerated as the insoluble portion increases. The metal per se and the oxides thereof are also effective. In general, the reaction velocity of esterification is lower than that of isomerization, and accordingly, the use of a large amount of insoluble portion is not required. Generally the amount of catalyst is within the range of from 0.01 to 5% by weight based on the reaction medium and the preferred range for achieving the object of this invention is from 0.01 to 1% by weight.

To carry out the reaction, especially in a heterogeneous reaction system, thorough mixing is an important factor. However, excessive agitation brings no advantage.

Incidentally, the process of this invention is not a mere combination of isomerization of dichlorobutenes and esterification of an isomer thereof. In fact, one of the characteristic features of this invention lies in the significant improvement in yield of isomerization reaction of dichlorobutadiene. That is, when isomerizing 3,4-isomer into 1,4-isomer by the prior art process, the yield of isomerization reaction is only 85%. When loss due to recovery operation of 1,4-isomer is considered, the yield of 1,4-isomer, is only 75~85% on the basis of 3,4-isomer used. Further, in the prior art, esterification reaction is necessary as well as the isomerization reaction above mentioned, and accordingly, over-all yield of 1,4-diacetoxy-2-butene is lower than 75~85%.

As shown in Example 1, in the process of this invention, the yield of 1,4-diacetoxy-2-butene based on the amount of 3,4-isomer reaches up to 88% by weight and when 1,2-diacetoxy-3-butene is included in the calculation, the yield goes up to 91% by weight.

The reason for such high yield is not completely clear. However, one possible explanation is that in the conventional isomerization of dichlorobutene, the loss of dichlorobutene by the formation of 1-chloro-1,3-butadiene is large due to a dehydrochlorination reaction. However, in the process of this invention, a stable ester is produced successively, so loss of dichlorobutene is minimized.

The following examples illustrate the invention.

EXAMPLE 1

125 g. of 3,4-dichloro-1-butene (purity 99%), 250 g. of acetic acid and 200 g. of anhydrous sodium acetate were put in a one liter round bottle flask equipped with an agitator and reflux cooler, and then 1 g. of copper acetate was added thereto. The mixture was agitated for 4 hours at a temperature of 120±5° C. After the reaction had been completed acetic acid was distilled off as completely as possible. Then, water and sodium carbonate were added to the contents of the flask, thereby neutralizing the reaction mixture. 161 g. of separated upper oily material was recovered. Aqueous phase and solid phase were dried at about 100° C. and were extracted with acetone. Said acetone phase was combined with said oily material and acetone was distilled off. Successively, under a reduced pressure of 20 mm. Hg (abs.), distillation was carried out until the distillation temperature reached 145° C. and 167 g. of distillate was obtained.

Analysis of the material by gas-chromatography gave the following results:

| | Wt. percent |
|---|---|
| Cis- and trans-1-chloro-4-acetoxy-2-butene | 6 |
| Cis- and trans-1,4-diacetoxy-2-butene | 91 |
| 1,2-diacetoxy-3-butene | 3 |

Conversion of dichlorobutene based on the formation of Cl⁻ was 96%. Almost no still bottom was found.

Comparative example

Under the same conditions as in Example 1, reaction was carried out for 8 hours under agitation at 120±5° C. but without the addition of anhydrous copper acetate. After the reaction had been completed, the mixture was cooled, and neutralized with water and sodium carbonate. The separated upper oily portion was collected and weighed as 127 g. The aqueous phase and solid phase were dried and extracted with acetone. Said acetone phase was combined with said oily material and acetone was then distilled off. Successively, distillation was carried out under atmospheric pressure and finally under a pressure of 20 mm. Hg (abs.) and the flask temperature was increased up to 170° C., 127 g. of distillate was obtained.

Analysis of the distillate by gas-chromatography gave the following composition:

| | Wt. percent |
|---|---|
| 3,4-dichloro-1-butene | 89.5 |
| Mono-acetoxy-butenes (3 isomers) | 7.0 |
| Diacetoxy-butenes (3 isomers) | 3.5 |

Conversion of 3,4-dichloro-1-butene based on the formation of Cl⁻ was 8.5%.

EXAMPLE 2

83.3 g. of 1,4-dichloro-2-butene, 41.7 g. of 3,4-dichloro-1-butene, 172 g. of 1,4-diacetoxy-2-butenes (mixture of cis- and trans-isomers) and 200 g. of anhydrous sodium acetate were put in a one liter round bottle type glass flask equipped with an agitator and refluxing cooler, 1 cc. of triethyl amine (a tertiary amine) and 1 g. of anhydrous copper acetate were added to the mixture. The mixture thus obtained was agitated for 4 hours at 120±5° C. After the reaction had been completed, the crystal was filtered out, and the filtered solid was further washed with tetrahydrofuran. The filtrate was combined with said tetrahydrofuran phase, and then tetrahydrofuran was distilled off. 341 g. of residuum was obtained. Analysis of the residuum by gas-chromatography gave the following composition:

| | Wt. percent |
|---|---|
| Cis- and trans-1-chloro-4-acetoxy-2-butenes | 3 |
| Cis- and trans-1,4-diacetoxy-2-butenes | 96 |
| 1,2-diacetoxy-3-butene | 1 |

The crystals obtained by the filtration were dissolved in water and the Cl⁻ ion content was measured. Conversion of dichlorobutenes was calculated from the amount of Cl⁻ ion and found to be 97%. After subtracting the 1,4-diacetoxy-2-butenes employed as reaction medium, the rate of 1,4-diacetoxy-2-butene formation from mixed dichlorobutenes corresponded to 90%.

EXAMPLE 3

125 g. of 3,4-dichloro-1-butene (purity 99%), 250 g. of anhydrous potassium acetate and 250 g. of acetic acid were put in a one liter round bottle glass flask equipped with an agitator and reflux cooler and then 5 g. of copper naphthenate was added thereto. The mixture was agitated for 4 hours at a temperature of 120±5° C. After the reaction had been completed acetic acid was distilled off as completely as possible. Then water and potassium carbonate were added to the contents of the flask, thereby neutralizing the reaction mixture. 163 g. of separated upper oily material was recovered. Aqueous phase and solid phase were dried at about 100° C. and were extracted with acetone. Said acetone phase was combined with said oily material and the acetone was distilled off. Successively, under a reduced pressure of 20 mm. Hg (abs.), distillation was carried out until the distillation temperature reached 145° C. and 168 g. of distillate was obtained.

Analysis of the material thus obtained by gas-chromatography gave the following results:

| | Wt. percent |
|---|---|
| Cis- and trans-1-chloro-4-acetoxy-2-butene | 7 |
| Cis- and trans-1,4-diacetoxy-2-butene | 91 |
| 1,2-diacetoxy-3-butene | 2 |

Conversion of dichlorobutene based on the formation of Cl⁻ was 96%. Almost no still bottom was found.

EXAMPLE 4

Under the same conditions and using the same apparatus and raw materials as in Example 1, reaction was carried out except that 10 g. of copper metal powder was added in lieu of cupric acetate. After the reaction had been completed post-treatment was carried out similarly. Acetone was then distilled off. Successively, distillation was carried out under a reduced pressure of 20 mm. Hg (abs.) until the distillation temperature went up to 145° C. and 165 g. of distillate was obtained.

Analysis of the distillate thus obtained by gas-chromatography gave the following composition:

| | Wt. percent |
|---|---|
| Cis- and trans-1-chloro-4-acetoxy-2-butene | 9 |
| Cis- and trans-1,4-diacetoxy-2-butene | 88 |
| 1,2-diacetoxy-3-butene | 3 |

Conversion of dichlorobutene based on the formation of Cl⁻ was 94%. Almost no still bottom was found.

EXAMPLE 5

Under the same conditions and using the same apparatus and raw materials as in Example 1, reaction was carried out except that 5 g. of iron metal powder was added in lieu of cupric acetate. After the reaction had been completed similar post-treatment was carried out. Then, the acetone was distilled off. Successively, distillation was carried out under a reduced pressure of 20 mm. Hg (abs.) until the distillation temperature went up to 145° C. and 167 g. of distillate was obtained.

Analysis of the distillate thus obtained by gas-chromatography gave the following composition:

| | Wt. percent |
|---|---|
| Cis- and trans-1-chloro-4-acetoxy-2-butene | 8 |
| Cis- and trans-1,4-diacetoxy-2-butene | 90 |
| 1,2-diacetoxy-3-butene | 2 |

Conversion of dichlorobutene based on the formation of Cl⁻ was 95%. Almost no still bottom was found.

EXAMPLE 6

Under the same conditions and using the same apparatus and raw materials as in Example 3, reaction was carried out except that 5 g. of cupric chloride was added in lieu of copper naphthenate. After the reaction had been completed similar post-treatment was carried out. Then, the acetone was distilled off. Successively, distillation was carried out under a reduced pressure of 20 mm. Hg (abs.) until the distillation temperature went up to 145° C. and 165 g. of distillate was obtained.

Analysis of the distillate thus obtained by gas-chromatography gave the following composition:

| | Wt. percent |
|---|---|
| Cis- and trans-1-chloro-4-acetoxy-2-butene | 6 |
| Cis- and trans-1,4-diacetoxy-2-butene | 92 |
| 1,2-diacetoxy-3-butene | 2 |

Conversion of dichlorobutene based on the formation of Cl⁻ was 97%. Almost no still bottom was found.

EXAMPLE 7

Under the same conditions and using the same apparatus and raw materials as in Example 3, reaction was carried out except that 10 g. of zinc powder was added in lieu of copper naphthenate. After the reaction had been completed similar post-treatment was carried out. Then, the acetone was distilled off. Successively, distillation was carried out under a reduced pressure of 20 mm. Hg (abs.) until the distillation temperature went up to 145° C. and 163 g. of distillate was obtained.

Analysis of the distillate thus obtained by gas-chromatography gave the following composition:

| | Wt. percent |
|---|---|
| Cis- and trans-1-chloro-4-acetoxy-2-butene | 10 |
| Cis- and trans-1,4-diacetoxy-2-butene | 87 |
| 1,2-diacetoxy-3-butene | 3 |

Conversion of dichlorobutene based on the formation of Cl⁻ was 93%.

EXAMPLE 8

Under the same conditions and using the same apparatus and raw materials as in Example 3, reaction was carried out except that 5 g. of zinc acetate was added in lieu of copper naphthenate. After the reaction had been completed similar post-treatment was carried out. Then, the acetone was distilled off. Successively, distillation was carried out under a reduced pressure of 20 mm. Hg (abs.) until the distillation temperature went up to 145° C. and 165 g. of distillate was obtained.

Analysis of the distillate thus obtained by gas-chromatography gave the following composition:

| | Wt. percent |
|---|---|
| Cis- and trans-1-chloro-4-acetoxy-2-butene | 9 |
| Cis- and trans-1,4-diacetoxy-2-butene | 88 |
| 1,2-diacetoxy-3-butene | 2 |

Conversion of dichlorobutene based on the formation of Cl⁻ was 94%.

EXAMPLE 9

Under the same conditions and using the same apparatus and raw materials as in Example 1, reaction was carried out except that 5 g. of copper benzoate was added in lieu of cupric acetate. After the reaction had been completed similar post-treatment was carried out. Then, the acetone was distilled off. Successively, distillation was carried out under a reduced pressure of 20 mm. Hg (abs.) until the distillation temperature went up to 145° C. and 168 g. of distillate was obtained.

Analysis of the distillate thus obtained by gas-chromatography gave the following composition:

| | Wt. percent |
|---|---|
| Cis- and trans-1-chloro-4-acetoxy-2-butene | 6 |
| Cis- and trans-1,4-diaicetoxy-2-butene | 92 |
| 1,2-diacetoxy-3-butene | 2 |

Conversion of dichlorobutene based on the formation of Cl⁻ was 97%.

What is claimed is:

1. In a process for preparing an acetic acid ester by reacting 3,4-dichloro-1-butene or a mixture of 3,4-dichloro-1-butene and 1,4-dichloro-2-butene with an alkali metal acetate, the improvement which comprises preparing a 1,4-diacetoxy-2-butene selectively by conducting the reaction in the presence of at least one elemental metal catalyst selected from the group consisting of copper, iron and zinc or a salt thereof at a temperature of from 70° C. to 150° C.

2. A process of claim 1 wherein the starting material is a reaction product of the vapor phase chlorination reaction of butadiene with elemental chlorine.

3. A process of claim 1 wherein the amount of catalyst is within the range of from 0.01 to 5% by weight based on the reaction medium.

4. A process of claim 1 wherein the reaction is carried out under agitation.

5. A process of claim 1 wherein triethyl amine is added as a co-catalyst.

6. A process of claim 1, wherein said salt is selected from the group consisting of copper, iron and zinc salts of formic acid, acetic acid, a naphthenic acid, benzoic acid, hydrochloric acid and sulfuric acid.

7. A process of claim 1, wherein said catalyst is selected from the group consisting of copper acetate, cupric chloride and elemental copper.

8. A process of claim 1 wherein the reaction is also conducted in the presence of acetic acid.

References Cited

UNITED STATES PATENTS

| 2,451,739 | 10/1948 | Isler et al. | 260—491 |
| 2,610,207 | 9/1952 | Lindlar | 260—491 |
| 3,028,431 | 4/1962 | Webb | 260—491 |
| 2,794,826 | 6/1957 | Bell et al. | 260—489 |
| 2,882,323 | 4/1959 | Weiss | 260—489 |

VIVIAN GARNER, Primary Examiner

U.S. Cl. X.R.

260—654 H